United States Patent [19]

Faroudja

[11] Patent Number: 5,420,622
[45] Date of Patent: May 30, 1995

[54] STOP FRAME ANIMATION SYSTEM USING REFERENCE DRAWINGS TO POSITION AN OBJECT BY SUPERIMPOSITION OF TV DISPLAYS

[76] Inventor: Philippe Y. C. Faroudja, 26595 Anacapa Dr., Los Altos, Calif. 94022

[21] Appl. No.: 763,957

[22] Filed: Sep. 23, 1991

[51] Int. Cl.⁶ ........................................... H04N 5/225
[52] U.S. Cl. ........................................ 348/48; 348/207
[58] Field of Search .................. 358/214, 209, 91, 88, 358/97, 93; 352/89, 50, 53, 54; H04N 7/18, 3/36, 5/253, 5/30, 13/00; 340/725; 348/48, 207, 46

[56] References Cited

U.S. PATENT DOCUMENTS

| | | | |
|---|---|---|---|
| 2,241,929 | 5/1941 | Kendig | 352/54 |
| 2,358,530 | 9/1944 | Nassour | 352/54 |
| 2,599,624 | 6/1952 | Gillette | 352/87 |
| 3,081,667 | 3/1963 | Goto | 352/87 |
| 3,970,521 | 7/1976 | Fedder | 352/52 |
| 4,100,572 | 7/1978 | Perisic | 358/93 |
| 4,261,012 | 4/1981 | Maloomian | 358/93 |
| 4,600,919 | 7/1986 | Stern | 340/725 |
| 4,769,699 | 9/1988 | Gebauer et al. | 358/97 |
| 4,821,718 | 4/1989 | Lafreniere | 358/108 |
| 5,008,697 | 4/1991 | Noble | 354/413 |
| 5,029,997 | 7/1991 | Faroudja | 352/54 |

FOREIGN PATENT DOCUMENTS

| | | | |
|---|---|---|---|
| 8605374 | 9/1986 | Germany | H04N 7/180 |
| 62-295588 | 12/1987 | Japan | H04N 7/180 |

*Primary Examiner*—Michael T. Razavi
*Assistant Examiner*—Tuan V. Ho
*Attorney, Agent, or Firm*—Janet K. Castaneda; James E. Eakin

[57] ABSTRACT

A stop-frame animation apparatus and method includes making a series of drawings representing the desired poses for the a three-dimensional object to be animated. The drawings are sequentially viewed by a first television camera which relays the image of the drawings onto a television monitor. The monitor simultaneously displays an image of the three-dimensional object to be animated from a second television camera. A semi-transparent mirror is used to divert a portion of the light from the three-dimensional object that is directed toward a motion picture camera to the second television camera. The two television cameras are synchronized by a common sync generator so that the two videos are properly mixed and the corresponding two images are superimposed in a proper spatial relationship. One then uses the mixing of the two images displayed simultaneously on the single monitor to position the object so that it conforms to the drawing seen on the television monitor. The object is then photographed in its posed position on a stop frame basis by the motion picture camera.

7 Claims, 1 Drawing Sheet

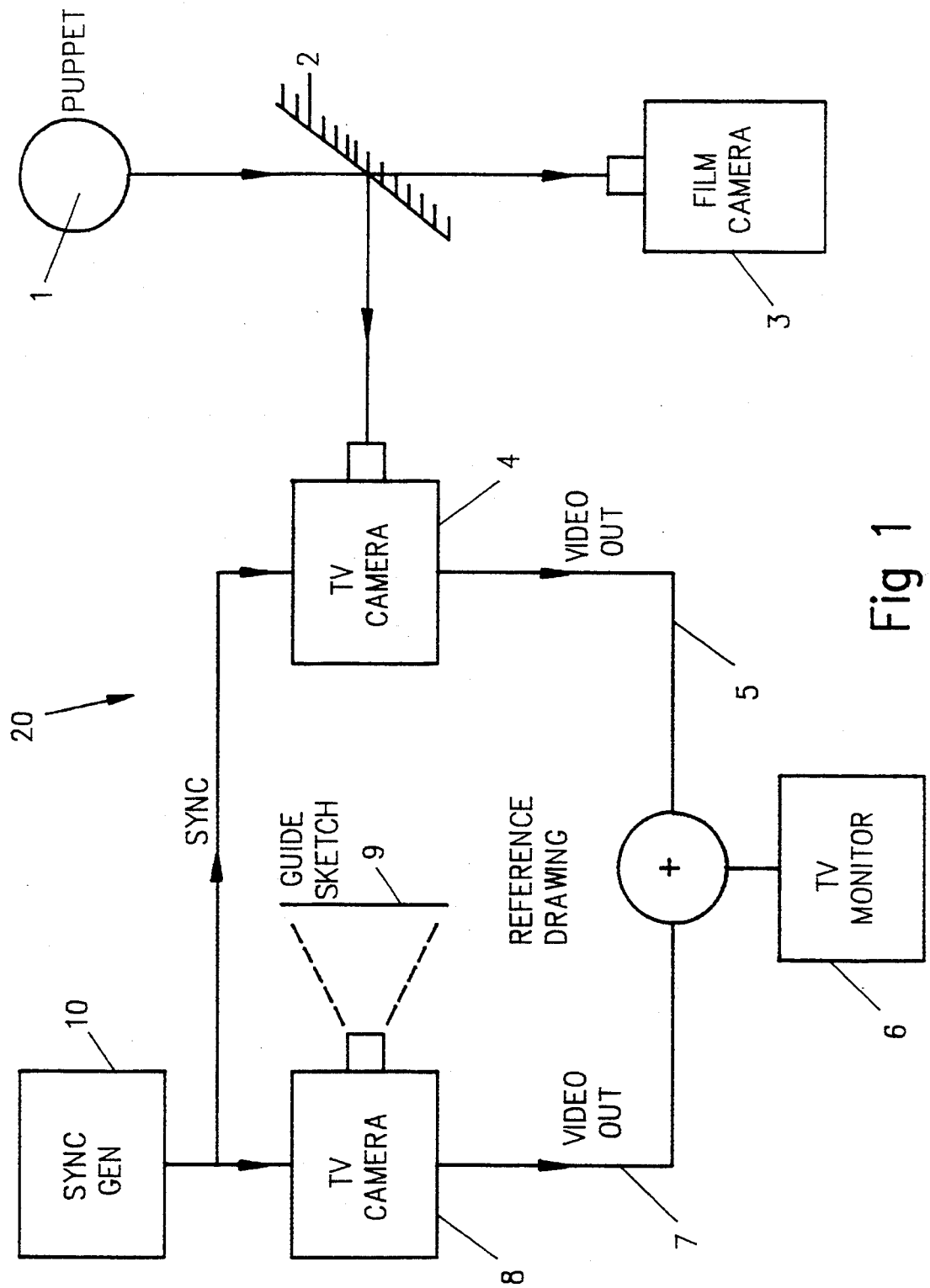

STOP FRAME ANIMATION SYSTEM USING REFERENCE DRAWINGS TO POSITION AN OBJECT BY SUPERIMPOSITION OF TV DISPLAYS

FIELD OF THE INVENTION

This invention relates to the production of motion pictures of three-dimensional animated objects such as puppets, dolls, clay figures, etc., in which the three-dimensional animated objects are sequentially photographed frame by frame and in which the complete film of the three-dimensional animated objects is projected at a normal frame rate giving the objects the illusion of life. This field of motion-picture making is commonly termed "stop-motion animation".

BACKGROUND OF THE INVENTION

In a usual production utilizing stop-motion animation, the producers determine the position of the animated three-dimensional object in each film frame usually by intuition. As it is nearly always impossible when producing stop motion animation to know, for example, precisely how much a figure's arm has moved in the last frame photographed and needs to move in the next, the producer must rely on his sixth sense to make the adjustment. This production method has a great disadvantage as the resulting movement of the three-dimensional figure or object in the final film produced looks slightly snappy or jerky, and lacks smoothness and realism. This jerkiness and lack of realism is present in virtually all films produced using stop-motion animation, even in films produced by those highly skilled in the art, and remains today the outstanding problem associated with stop-motion animation. The present invention is concerned with eliminating this problem.

Attempts have been made in the past to develop several techniques and inventions in order to eliminate such jerky movement and to impart instead greater realism to the production of stop motion animation. All such prior techniques, however, have inherent disadvantages, which will be discussed.

One prior approach, disclosed in U.S. Pat. No. 2,241,929 utilizes an arrangement of steps including first making a series of drawings and producing a film strip from the resultant drawing series, sequentially posing the object in conformity with the projected screen image that is behind the object, and finally, sequentially photographing the object in its posed positions for the production of a finished film. This prior method allowed the producers of the stop-motion animated film a degree of planning with regard to the object to be animated. However, the technique had a disadvantage in that at best one could only match the outline of the object to the projected image on the screen (in this technique's most precise form, one matches the object's shadow cast on the screen to the projected film image on the screen); it is thus impossible to determine the required location of those portions of the object within the object's outline. For example, in the case of a human-like doll seen walking in profile in a position in which its arm is within its torso's outline rather than extended from the torso, it would be impossible to determine the exact location of the arm in this posed position. Therefore, this technique lacks precision. Another technique in this patent calls for alignment of interior features by projecting the animation frame directly onto the puppet. Such a technique is imprecise because of the difficulty in determining the precise point at which a line begins and ends. In addition, all lines of a frame may not be projected on the unposed puppet, for example the succeeding frame may contain an extended arm with portions oriented considerable higher than the present position of the posed puppets arm. Furthermore, some of the projected lines may be out of focus on the three-dimensional puppet.

Another technique, disclosed in U.S. Pat. No. 2,358,530, utilized an alignment grid composed of a series of squares. This grid was in close proximity to the puppet or object to be animated in the usual stop-motion fashion. After posing the puppet in one position, one noted the positions of the arms, legs, etc., onto the grid, then utilized these grid notations for reference while posing the doll in the next position, and repeated this process throughout the film's production. The disadvantage of this prior technique is, firstly, that it does not allow extensive preplanning of the puppet's posed positions such as in the prior technique previously discussed, because one is noting positions only after they have been set. Secondly, the technique allows one to note only the positions of those portions of the body which are on the outline of the body, and not those within the torso. This approach results in the same problem which existed in the technique previously discussed: lack of precision.

Another prior art technique, disclosed in U.S. Pat. No. 2,599,624 made use of a similar type of alignment grid. Specifically, in this arrangement, two alignment grids were utilized to coordinate the positions of a puppet with a previously filmed sequence of a live actor (which is projected in close proximity to the puppet). The disadvantage of this system is that the movements of the puppets must be based on the movements of what the invention terms "live talent"—that is, the movement of humans or animals. This is limiting to the producer of stop-motion of imaginary creatures, such as dinosaurs or three-headed dragons, of which no previously filmed "live talent" exists. This is a severe disadvantage as stop-motion animation is very often utilized precisely because it is the only method known in which imaginary creatures can come to life. Also, in this method there is no precise visual superimposition of the object and live actor's respective positions, as a side-by-side comparison requires a subjective, thus approximate, positioning of the puppet.

Another prior art technique, disclosed in U.S. Pat. No. 3,970,379, attempted to impart greater realism to stop-motion animation by sequentially projecting (from above the stage) a film of predetermined indices onto the stage upon which the three-dimensional puppets or objects rest, sequentially posing the puppets or objects on the stage in conformity with the projected indices, and sequentially photographing the puppets or objects in their posed positions for the production of a finished film. The disadvantage of this scheme is that, while it made the smooth movement of the puppets or objects about the stage possible, it did not provide indices for the movement of animatable portions of the puppets' or objects' bodies, such as their arms or legs. The scheme only provided indices for the puppets' or objects' stage movement. As a result, a puppet may move about the stage fairly smoothly but still move its arms, legs, head, etc., in the slightly jerky and unrealistic fashion that is typical of stop-motion animation.

Yet another prior art technique, disclosed in U.S. Pat. No. 3,081,667, attempted to impart greater realism to puppet or doll-films in an especially ingenious way. Through the utilization of a scheme involving a camera, a projector, and a semi-transparent mirror, one was able to superimpose the position of the puppet that one was animating in the usual frame-by-frame fashion with the image of a living being (such as an actor) that is projected frame-by-frame from a previously photographed motion-picture film. The mirror was used to superimpose the 2 images from the object and the reference (guide) drawing to be recorded by a single camera. This prior approach no doubt made possible the production of more realistic puppet and doll-films, but the approach has the same severe disadvantage as previously noted with U.S. Pat. No. 2,599,624. As the movement of the puppet or doll is based upon the movement of what the inventor himself terms a "living creature" (the creature being previously photographed onto motion picture film), the invention does not make possible the realistic movement of puppets or dolls which are imaginary creatures, such as dinosaurs or dragons, as no living creature exists upon which one can base the movements. As was the case in the previously discussed technique, this approach severely limits the producer of the stop-motion animated film.

Finally, another prior art technique introduced by the present inventor and disclosed in U.S. Pat. No. 5,029,997, imparts greater realism to stop-motion. According to this method, one first makes a series of drawings of the object to be animated in various sequential positions; one then transfers the drawings to transparencies; the transparencies are then sequentially mounted onto a stationary indexing jig located between the three-dimensional object and the film camera; one then poses the object so that it conforms to the position depicted by the transparency; the transparency is then removed from the jig so that it isn't photographed by the film camera; and finally, the object is photographed in its posed position by the film camera on a stop frame basis (one of course repeats this series of steps until the sequence is completed).

While the above technique imparts greater realism, it still requires a number of steps to complete a film sequence. In addition, it may be difficult in certain circumstances to simultaneously focus the transparency and the three-dimensional object, particularly while looking through a relatively small motion picture camera viewfinder during the alignment process.

Film-making is a complex and difficult endeavor, and stop-motion is particularly difficult. Thus, a hitherto unsolved need exists for an improved stop-frame animation system.

SUMMARY OF THE INVENTION WITH OBJECTS

A general object of the present invention is to provide a stop-frame animation system that overcomes the limitations and drawbacks of the prior art by greatly simplifying and hastening the animation process.

A specific object of the invention is to provide a stop-frame animation method enabling accurate positioning of any conceivable three-dimensional subject, whether a puppet, doll, clay figure, inert object, living organism or being, etc., to be photographed by stop-motion animation so that the appearance of smooth and realistic motion is created when the film is projected.

Another object of the present invention is to provide a stop-frame animation system that eliminates a number of previously required steps, and solves focusing problems, by eliminating the need for a jig and transparency.

Yet another specific object of the present invention is to provide a stop-frame animation method with a television monitor used for alignment procedures.

A stop-motion film utilizing the stop-frame animation method and apparatus disclosed herein includes the steps of first, making a series of drawings representing the three-dimensional object to be animated in various sequential positions; sequentially embodying the drawings on a projection medium such as motion picture film or video; displaying the projection medium at real time to see if the motion depicted by the drawings is the motion desired; and repeating the foregoing steps until the desired motion is realized. Once the drawings depicting the desired motion are realized, the drawings are sequentially placed in front of a first television camera which in turn relays the image of the drawings onto a television monitor. This monitor also displays, at the same time, an image of the three-dimensional object to be animated exactly as seen through a motion picture camera viewfinder. A semi-transparent mirror is used to divert a portion of the light from the three-dimensional object and headed for the motion picture camera to a second television camera which in turn relays an image of the object to the aforementioned television monitor. The two television cameras are synchronized by a common sync generator so that the two videos are properly mixed and the corresponding two images are superimposed in a proper spatial relationship. One then uses the mixing of the two images displayed simultaneously on the single monitor—the image of the three-dimensional object and the image of the drawing—to position the object so that it conforms to the drawing seen on the television monitor. The object is then photographed in its posed position on a stop frame basis by the motion picture camera. The next drawing in sequence is then used to re-position the object for the next stop frame, and this process of repositioning and stop frame imaging continues until the sequence is complete, thereby yielding a finished stop frame work for projection purposes.

These and other objects, aspects, advantages and features of the present invention will be more fully appreciated by considering the following detailed description of a preferred embodiment presented in conjunction with the accompanying drawings.

BRIEF DESCRIPTION OF THE DRAWINGS

In the Drawings:

FIG. 1 is a block diagram showing the components of the stop-frame animation system of the present invention.

DETAILED DESCRIPTION OF A PREFERRED EMBODIMENT

Referring to FIG. 1, the stop-frame animation system of the present invention is shown generally at 20. The three-dimensional object 1 to be animated may be, for example, an imaginary clay-figure such as a dinosaur. However, it will be recognized by those skilled in the art that the method and apparatus disclosed herein makes possible the smooth movement of not only imaginary creatures and clay figures, but any three-dimensional object including dolls and puppets, living organisms, and generally inert objects. For example, a pencil may be shown moving across a desk by the stop-motion animation system. Living beings can also have their movements characterized by the invention to produce humans that move by the process of stop-motion animation, as shown for example in the work of Canadian film-maker Norman MacLaren.

Photographing the three-dimensional object 1 to be animated is a motion picture camera 3, such as a 16 mm Bolex camera. It should also be understood that when reference is hereinafter made to motion picture cameras, it is also intended to cover any picture image capturing and recording device, such as a videocamera or computer input device or tablet, that can record the successive positions of an animated object on a frame-by-frame basis and in a manner functionally duplicative of a stop-motion film camera. Given the foreseeable advances in image recording technology, any storing device that is able to record sequential movements of an object to achieve animation similar to that achieved with film or television cameras is intended to be embraced and included whenever reference is hereinafter made to a motion picture camera.

Between the object 1 and motion picture camera 3 is placed a commercially available semi-transparent mirror 2. The mirror 2 reflects some of the light from the set and from the object 1 into a conventional television camera 4. Light also passes through the mirror 2 to the motion picture camera 3. The semi-transparent mirror is thus used to separate a single image from the object 1 onto 2 distinct cameras, 3 and 4.

The television camera 4 in turn relays by means of a cable 5 the image of the object 1 onto a television monitor 6. The television monitor 6 is conventional and of the type able to receive two signals simultaneously for display as split images.

A pre-formed series of representations or drawings 9 depicting the object 1 is used to show the object 1 in the desired sequence of movement, for example, walking. These drawings 9 may simply be sketches on paper or some other suitable material. The drawings 9 may be generated by the hand of an artist or by a computer or other apparatus.

The film maker places the first guide sketch 9 within view of a television camera 8. The camera 8 relays the image of the sketch 9 electronically via a cable 7 onto the television monitor 6. The two cameras 4 and 8 are synchronized by a conventional sync generator 10 so that the two resulting images are properly mixed.

Television monitor 6 thus displays synchronized images of both the image of the guide 9 and the image of the object 1 on the same screen simultaneously, and the two images are then electronically superimposed in proper spatial relationship.

The object 1 is then posed so that it conforms with the guide sketch 9 as seen on television monitor 6. The motion picture camera 3 then photographs the object 1 in its posed position, and the process is repeated until the sequence is completed.

It will be obvious to those skilled in the art that with today's motion picture technology, it is common to have both the semi-transparent mirror 2 and the television camera 4 located within the body of motion picture camera 3. Such combined devices are called "video taps" and are used for displaying on video what is being at the same time recorded on film in the production of many major motion pictures today. It would certainly be appropriate to use video taps in connection with this invention, and indeed this invention embraces and includes video tap use.

From the above detailed description of the invention, then, it is believed that the construction and operation thereof will at once by apparent to those skilled in the art, and it is to be understood that the above described embodiments of the invention are merely illustrative of the principles thereof and that numerous modifications and embodiments of the invention may be derived within the scope and spirit thereof.

What is claimed is:

1. An apparatus for generating a stop frame animation sequence of a tangible, positionable object, the apparatus comprising:
    an optical device for splitting light from the object into two separate beams and obtaining a first and a second image of the object;
    pre-formed representation means depicting desired positions for the object;
    electronic means for viewing and simultaneously displaying the representation means and the first image of the object, the simultaneous display for positioning the object with reference to the representation means; and
    a recording means for recording the second image of the object.

2. The apparatus of claim 1 wherein the optical device is a semi-transparent mirror.

3. The apparatus of claim 1 wherein the electronic means comprises a monitor and two television cameras, a first camera for viewing the representation means and a second camera for obtaining the first image of the object, the monitor for simultaneously displaying the representation means and the first image of the object, the monitor having means for superimposing the simultaneous displays.

4. The apparatus of claim 3 further comprising means for synchronizing the first and second cameras.

5. The apparatus of claim 3 wherein the monitor is a television monitor.

6. The apparatus of claim 1 wherein the recording means comprises a motion picture camera mounted in a housing, the housing further containing the electronic means and the optical device.

7. An apparatus for generating a stop frame animation film of a three-dimensional object, the apparatus comprising:
    an optical device means for splitting the light emanating from the three-dimension object into two separate beams and obtaining a first and a second image of the object;
    a first image generation means for receiving one of the two separate beams and generating the first image of the object, the first image generation means having means for transmitting the first image;
    at least two preformed representation means depicting desired poses for the three-dimensional object;
    a representation image generation means for generating and viewing an image of the preformed representation means, the representation image generation means having means for transmitting the image of the preformed representation means;
    a monitor means for receiving and displaying the first image and the image of the preformed representation means for comparison, the monitor means having means for superimposing the first image and the preformed representation means image; and
    a recording means for recording the second image of the three-dimensional object following positioning to conform the position of the object to the superimposed image.

* * * * *